United States Patent
Bamberg

(10) Patent No.: US 7,757,927 B2
(45) Date of Patent: Jul. 20, 2010

(54) METHOD FOR JOINING STRUCTURAL COMPONENTS

(75) Inventor: Joachim Bamberg, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 283 days.

(21) Appl. No.: 11/450,237

(22) Filed: Jun. 8, 2006

(65) Prior Publication Data

US 2006/0278685 A1 Dec. 14, 2006

(30) Foreign Application Priority Data

Jun. 9, 2005 (DE) .................. 10 2005 026 497

(51) Int. Cl.
*B23K 20/12* (2006.01)
(52) U.S. Cl. .................. 228/112.1; 228/2.1
(58) Field of Classification Search .............. 228/112.1, 228/2.1
See application file for complete search history.

(56) References Cited

U.S. PATENT DOCUMENTS

| 4,874,674 A * | 10/1989 | Oda et al. .................. 428/469 |
| 5,495,977 A | 3/1996 | Hildebrandt et al. |
| 5,865,364 A * | 2/1999 | Trask et al. .................. 228/212 |
| 6,095,402 A | 8/2000 | Brownell et al. |
| 6,219,916 B1 | 4/2001 | Walker et al. |
| 6,478,545 B2 * | 11/2002 | Crall et al. .............. 416/213 R |
| 7,451,908 B2 * | 11/2008 | Gropallo ..................... 228/183 |
| 2003/0168494 A1 | 9/2003 | Halley et al. |
| 2003/0197049 A1 | 10/2003 | Bagnall |
| 2005/0124432 A1 | 6/2005 | Huang et al. |

* cited by examiner

*Primary Examiner*—Jessica L Ward
*Assistant Examiner*—Megha Mehta
(74) *Attorney, Agent, or Firm*—W. F. Fasse; W. G. Fasse

(57) ABSTRACT

Two structural components, such as a gas turbine rotor hub and a rotor blade, are integrally joined to each other by friction welding, particularly linear friction welding. For this purpose, each component is provided with a joining surface and at least one of the two components is provided with a groove next to the respective joining surface. The groove extends fully or partly around the respective joining surface and serves for reducing stress in a normal and radial direction of the respective joining surface, whereby a more uniform heating of the joining zone is achieved and joining faults are avoided or at least reduced during the friction welding.

18 Claims, 1 Drawing Sheet

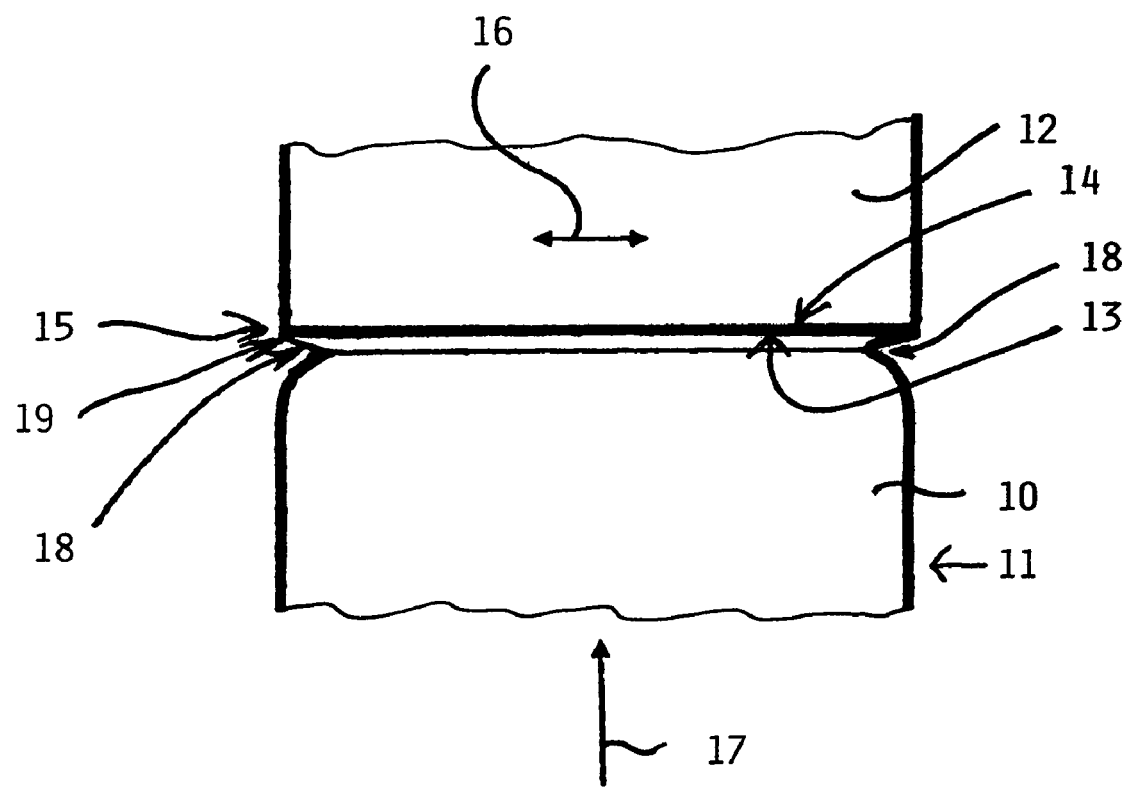

METHOD FOR JOINING STRUCTURAL COMPONENTS

PRIORITY CLAIM

This application is based on and claims the priority under 35 U.S.C. §119 of German Patent Application 10 2005 026 497.2, filed on Jun. 9, 2005, the entire disclosure of which is incorporated herein by reference.

FIELD OF THE INVENTION

The invention relates to a method for joining structural components, particularly joining a rotor blade or blades to a rotor base body or hub. This method is particularly suitable for the production of new gas turbine rotors and for the repair of gas turbine rotors having integral rotor blades.

BACKGROUND INFORMATION

Friction welding is commonly or widely used as a joining method. in a manufacture of gas turbines. Friction welding is a method within the group of so-called pressure welding methods. Friction welding permits joining or interconnecting structural components by friction. In connection with linear friction welding, one of the structural components is moved back and forth in a translatory direction whereas the other structural component is stationary and pressed with a certain force against the moving structural component. During the friction welding, the joining surfaces of the structural components to be joined or interconnected adapt to each other by heat forging. The linear friction welding is considered to be part of the so-called oscillating friction welding methods. Further friction welding methods include the so-called rotation friction welding and the so-called turning or stirring friction welding.

In connection with a conventional procedure for joining or interconnecting structural components by oscillating friction welding, namely a linear friction welding, the two components to be joined to each other are rubbed against one another whereby one structural component is moved back and forth in a translatory direction while preferably a defined upsetting pressure is applied to the joining surface through the other structural component of the two components. Reference can be made in this regard for example to U.S. Pat. No. 6,219,916 and U.S. Pat. No. 6,095,402. During applying the friction motion to the structural components to be joined, the two joining surfaces do not always coincide. Rather, free surface areas where there is no overlap occur temporarily in a marginal zone of the surfaces to be joined. These temporarily free surface areas are exposed to a possible contamination, for example, if the linear friction welding is performed under the normal atmosphere, the free non-overlapping surface areas are exposed to contamination by oxygen whereby brittle phases can occur in the joining zone between the two structural components to be joined. Such brittle phases impair the material strength of the junction or joint.

In order to avoid such contaminations by oxygen, it is known to perform the linear friction welding in a protective gas atmosphere, for example in an argon atmosphere. However, it has been found that even when the linear friction welding is performed in an argon atmosphere, contaminations or faults can occur in the junction or joining zone. Such faults involve the formation of hose-shaped or tubular pores filled with argon gas. These argon filled hose pores remain while applying the upsetting pressure. Such hose pores may have a negative effect on the so-called vibration or oscillation strength of the junction or joining zone produced by linear friction welding.

OBJECTS OF THE INVENTION

In view of the foregoing, it is the aim of the invention to achieve the following objects singly or in combination;
to provide a new method for joining structural components which avoids the above problems;
to assure a more uniform heating of the joining surfaces during the friction welding;
to reduce stress occurring in the joining or junction surfaces;
to avoid the formation of argon filled so-called hose pores; and
to improve the oscillation or vibration strength of the joining zone between two structural components.

SUMMARY OF THE INVENTION

The above objects have been achieved by performing a friction welding operation with the following steps:
a) providing two structural components to be joined to each other with a respective joining surface, whereby a joining or junction zone is formed between the two structural components by the following friction welding;
b) forming at least one groove partially or preferably completely surrounding at least one of the structural components to be joined, said groove being formed next to or neighboring a respective joining surface of the structural component provided with the groove;
c) aligning and contacting the two joining surfaces; and
d) connecting the two structural components by an oscillating friction welding, particularly a linear friction welding step.

According to the invention it is suggested that a groove is formed in at least one of the two structural components to be joined. The at least one circumferential groove is positioned next to or neighboring the respective junction or joining surface of the respective structural component. The formation of at least one such circumferentially extending groove in at least one of the structural components to be joined causes an elastic marginal zone in the joining surfaces. Such an elastic zone relieves mechanical stress in the marginal zone of the joining surfaces when the linear friction welding is performed. As a result it is possible to reduce stress extending perpendicularly to the joining surfaces as well as shearing stress in the marginal zone of the joining surfaces. Thus, it is assured that the joining surfaces are heated more uniformly throughout the surface areas while the linear friction welding is performed. The formation of hose pores filed with argon in the marginal zone of the joining surface or surfaces can thus be effectively avoided. By forming at least one circumferential groove in at least one of the structural components to be joined, a so-called elastically soft joining lip is realized which prevents the formation of argon filled hose pores in the marginal zones of the joining surfaces or rather the joining zone. As a result, the oscillation or vibration strength of the joining zone can be improved.

The invention further aims at avoiding or overcoming the disadvantages of the prior art, and to achieve additional advantages, as is apparent from the present specification. The attainment of these objects is, however, not a required limitation of the claimed invention.

BRIEF DESCRIPTION OF THE DRAWINGS

In order that the invention may be clearly understood, it will now be described, with reference to the accompanying drawing, wherein the single FIGURE shows a side view of a joining zone between two structural components such as a hump of a gas turbine rotor and a rotor blade secured to the hump in accordance with the method of the present invention.

DETAILED DESCRIPTION OF A PREFERRED EXAMPLE EMBODIMENT AND OF THE BEST MODE OF THE INVENTION

The single FIGURE illustrates the method according to the invention for joining structural components with reference to the example of producing or repairing an integral bladed gas turbine rotor. As shown, the radially inner end of a rotor blade 12 is to be joined to a radially outwardly facing blade hump 10 of a rotor base body 11. The joining of the rotor blade 12 to the rotor blade hump 10 of the rotor base body 11 is accomplished by an oscillating friction welding especially a linear friction welding. Prior to the welding step, each of the two structural components is provided with a respective joining surface 13 and 14 respectively. When the joining surfaces are joined, a joining zone 15 is formed between the two components. Once the two joining surfaces 13 and 14 are formed and aligned with each other by aligning the rotor blade 12 relative to the blade hump 10, the joining takes place conventionally by an oscillating friction welding such as linear friction welding whereby preferably the rotor blade 12 is moved in a translatory direction 16 back and forth while the rotor with its hump 10 is kept stationary. Upon reaching a sufficient welding temperature of the joining surfaces 13 and 14, a certain upsetting force is applied in the direction of the arrow 17 for pressing the hump 10 against the moving rotor blade 12. The upsetting force may also be applied through the rotor blade 12. The oscillating friction welding is performed in a protecting gas atmosphere, preferably under a so-called argon shower.

The invention departs from the above described sequence of steps in order to avoid the problem that is caused by the fact that non-overlapping surface areas are formed along margin zones of the joining surfaces 13 and 14 when one component moves relative to the other component. So-called hose pores filled with argon are formed in these free and non-overlapping areas. It has been found that such argon-filled hose pores remain in the surface areas even after applying a high upsetting pressure as mentioned. These hose pores impair the vibration or oscillation strength of the joining zone 15. The invention solves this problem by forming at least one groove 18 in at least one of the two structural components to be joined. This groove 18 can be formed in one or the other or both structural components prior to aligning the joining surfaces or after the alignment.

In the example embodiment shown in the single FIGURE, the groove 18 is formed around the blade hump 10 of the rotor base body 11. The groove 18 is positioned next to or neighboring the joining surfaces 13 of the hump 10. The groove 18 extends preferably all around the respective component to be joined. As can be seen in the FIGURE, the groove 18 is a radially outwardly open circumferential groove encircling a radially outwardly facing perimeter surface of the blade hump 10, and the groove 18 lies on a groove plane parallel to the joining surface 13. The groove 18 reduces a cross-sectional area of the blade hump 10 perpendicularly to the joining surface 13 or particularly on the groove plane parallel to the joining surface. It has been found that such a groove 18 (or grooves) forms (or form) an elastically soft sealing lip 19 in the marginal zone of the respective joining surface 13, i.e. around the perimeter rim of the joining surface 13 between the groove 18 and the joining surface 13. Such a sealing lip 19 relieves the mechanical stress in the marginal zone of the joining surfaces 13 and 14 by reducing the stress effective perpendicularly to the joining surfaces as well as any shearing stress effective in the marginal area of the joining zone 15, more specifically in the marginal zone of the joining surfaces 13 and 14. The formation of argon-filled hose pores or tubular pores in the marginal area of the joining zone 15 has thus been effectively avoided particularly in the free non-overlapping areas of the joining surfaces 13 and 14. These non-overlapping surface areas are only present during the relative motion. Thus, it has now been made possible according to the invention to produce these joints or junctions with an oscillating or linear friction welding with an optimal strength, particularly an optimal vibration or oscillation strength.

In the example embodiment shown in the single FIGURE, a circumferential groove 18 is only provided in the hump 10 next to the joining surface 13. According to the invention it is possible to provide several grooves 18 with an increasing spacing from the joining surface 13 of the blade hump 10. As a further embodiment of the invention, the blade hump 10 as well as the rotor blade 12 may each be provided with at least one circumferential groove 18 positioned next to the respective joining surface 13 and 14. Similarly it is possible to provide just one groove in the rotor blade 12 next to the joining surface 14.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of joining two structural components to each other, said method comprising the following steps:
   a) providing each of said two structural components with a joining surface thereby forming two joining surfaces,
   b) forming at least one groove (18) in at least a first structural component of said two structural components, said at least one groove being positioned next to a respective said joining surface of said first structural component, said at least one groove extending around a perimeter of said first structural component next to said respective joining surface so that said groove reduces a cross-sectional area of said first structural component on a section plane parallel to said respective joining surface,
      wherein said groove is a radially outwardly open groove in a radially outwardly facing perimeter surface of said first structural component, and
      wherein said groove is displaced next to said respective joining surface so as to form a joining lip that tapers radially outwardly to a joining lip edge running around said perimeter of said first structural component adjoining said respective joining surface such that said joining lip edge lies on and extends along a joining surface plane on which said respective joining surface lies, and
      wherein, relative to said cross-sectional area of said first structural component in said groove, said joining lip has a larger cross-sectional area on said joining surface plane,
   c) contacting and aligning said two joining surfaces with each other, and
   d) joining said two structural components to each other at said two joining surfaces by applying a an oscillating linear friction welding procedure to said two structural components along said two joining surfaces, comprising moving at least one of said structural components relative to another of said structural components in a friction motion direction along said joining surface plane.

2. The method of claim 1, wherein said step b) is performed on each of said two structural components next to a respective joining surface of said two joining surfaces.

3. The method of claim 1, comprising selecting as said two structural components a gas turbine rotor base body and a rotor blade, providing a radially inner end of said rotor blade with a first joining surface of said two joining surfaces, providing a radially outwardly facing portion of said rotor base body with a second joining surface of said two joining surfaces, and forming said at least one groove (18) exclusively next to only one of said two joining surfaces.

4. The method of claim 3, comprising performing said method steps in a production of new gas turbine rotors.

5. The method of claim 3, comprising performing said method steps in a repair of damaged gas turbine rotors.

6. The method of claim 3, comprising forming said groove in a hump of said gas turbine rotor base body next to said second joining surface.

7. The method of claim 3, wherein said groove is formed in said rotor blade next to said first joining surface.

8. The method of claim 1, further comprising performing said friction welding procedure in a protective gas atmosphere.

9. The method of claim 1, wherein said step b) involves forming said at least one groove as a circumferential groove extending continuously entirely around said perimeter of said first structural component on a groove plane parallel to said respective joining surface.

10. The method of claim 1, wherein in said step b), said radially outwardly open groove is bounded between and enclosed by said joining lip and by a body of said first structural component forming two closed groove sides of said groove opposite one another in a direction orthogonal to said plane of said joining lip.

11. A method of joining two structural components, comprising the steps:
 a) providing a first structural component having a first joining surface;
 b) providing a second structural component having a second joining surface;
 c) forming a groove around a perimeter of said first structural component, proximate to and displaced from said first joining surface so as to form a joining lip that tapers radially outwardly to a joining lip edge running around said perimeter adjoining said first joining surface such that said joining lip edge lies on and extends along a joining surface plane on which said first joining surface lies, wherein said joining lip, on said joining surface plane has an increased cross-sectional area relative to a cross-sectional area of said first structural component in said groove;
 d) contacting said first and second joining surfaces on one another; and
 e) during said contacting, oscillatingly moving at least one of said joining surfaces relative to a respective other one of said joining surfaces in a friction motion direction along said joining surface plane, so as to cause linear frictional welding of said joining surfaces to one another.

12. The method according to claim 11, wherein said joining lip is an elastically soft joining lip.

13. The method according to claim 11, wherein said step c) involves forming said groove as a radially outwardly open groove in a radially outwardly facing perimeter surface forming said perimeter of said first structural component and wherein said groove is bounded between and enclosed by said joining lip and by a body of said first structural component forming two closed groove sides of said groove opposite one another in a direction orthogonal to said plane of said joining lip.

14. The method according to claim 13, wherein said step c) involves forming said groove as a continuous perimeter groove extending continuously entirely around said perimeter of said first structural component on a groove plane parallel to said first joining surface.

15. The method according to claim 11, wherein said groove forms, in said first structural component, on a plane of said groove parallel to said first joining surface, a neck with a reduced outer cross-section relative to said perimeter of said first structural component on both sides of said neck in a direction orthogonal to said plane of said groove.

16. A method of joining two structural components, comprising the steps:
 a) providing a first structural component including a component body portion, an end portion, and a transition portion between said component body portion and said end portion, and having a first joining surface lying on and defining a joining surface plane on a free end of said end portion, wherein said component body portion, said transition portion, and said end portion all have an initial component cross-section;
 b) providing a second structural component having a second joining surface;
 c) forming a groove around a perimeter of said transition portion of said first structural component, proximate to and displaced from said first joining surface so that said groove forms, in said transition portion of said first structural component, a neck with a reduced cross-section relative to said initial component cross-section on a plane parallel to said joining surface plane of said first joining surface, while maintaining said initial component cross-section of said component body, and forming in said end portion a joining lip that tapers radially outwardly to a joining lip edge lying on said joining surface plane with a resultant cross-section of said joining lip of said end portion being larger than said reduced cross-section of said neck in said transition portion;
 d) contacting said first and second joining surfaces on one another; and
 e) during said contacting, oscillatingly moving at least one of said joining surfaces relative to a respective other one of said joining surfaces in a friction motion direction along said joining surface plane, so as to cause linear frictional welding of said joining surfaces to one another.

17. The method according to claim 16, wherein said step c) is performed before said step d).

18. The method according to claim 16, wherein said step d) is performed before said step c).

* * * * *